United States Patent
Ohsumi et al.

(10) Patent No.: US 8,223,203 B2
(45) Date of Patent: Jul. 17, 2012

(54) CAMERA FOR MOUNTING IN MOTOR VEHICLE

(75) Inventors: Ken Ohsumi, Hitachinaka (JP); Jun Hayakawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1015 days.

(21) Appl. No.: 12/186,980

(22) Filed: Aug. 6, 2008

(65) Prior Publication Data

US 2009/0046149 A1 Feb. 19, 2009

(30) Foreign Application Priority Data

Aug. 9, 2007 (JP) ................................. 2007-208321

(51) Int. Cl.
- *H04N 7/18* (2006.01)
- *H04N 5/225* (2006.01)
- *H04N 5/222* (2006.01)
- *H04N 3/08* (2006.01)
- *H04N 5/228* (2006.01)
- *G02B 7/28* (2006.01)

(52) U.S. Cl. ........ 348/148; 348/143; 348/122; 348/373; 348/333.07; 348/203; 348/208.11; 396/117

(58) Field of Classification Search .................. 348/143, 348/122, 373, 333.07, 203, 208.11; 396/117
See application file for complete search history.

(56) References Cited

U.S. PATENT DOCUMENTS

| | | | |
|---|---|---|---|
| 6,392,218 B1 | 5/2002 | Kuehnle | |
| 8,040,376 B2 * | 10/2011 | Yamada et al. | 348/148 |
| 8,077,201 B2 * | 12/2011 | Wimmer et al. | 348/146 |
| 2002/0067426 A1 * | 6/2002 | Nagata et al. | 348/373 |
| 2007/0025596 A1 | 2/2007 | Ravier et al. | |
| 2010/0195226 A1 * | 8/2010 | Heslin et al. | 359/844 |

FOREIGN PATENT DOCUMENTS

| | | |
|---|---|---|
| JP | 2003-335180 A | 11/2003 |
| WO | WO 02/095757 A2 | 11/2002 |
| WO | WO 2007/091247 A1 | 8/2007 |

OTHER PUBLICATIONS

European Search Report dated May 19, 2009 (Five (5) pages).

* cited by examiner

*Primary Examiner* — John Follansbee
*Assistant Examiner* — Alan S Chou
(74) *Attorney, Agent, or Firm* — Crowell & Moring LLP

(57) ABSTRACT

Disclosed herein is a vehicle-mounted type of camera capable of being reduced in the space required for installation on the windshield of a vehicle.

An imaging unit 15 is provided on a substrate 19 and has an optical axis in a direction perpendicular to the substrate surface. The substrate 19 is set up in parallel with respect to the windshield of the vehicle. A lens 14 is disposed on the optical axis. A mirror 16 is also provided on the optical axis of the imaging unit 15, and is adapted to change a direction of the optical axis to a frontward direction of the vehicle, thus guiding frontward visual field information of the vehicle to the imaging unit 15. The mirror 16 is retained in an attachment 11. The attachment 11 can be engaged with and disengaged from an enclosure 12 that holds the lens 14.

4 Claims, 9 Drawing Sheets

CAMERA FOR MOUNTING IN MOTOR VEHICLE

BACKGROUND OF THE INVENTION

1. Field of the Invention

The present invention relates generally to cameras for mounting in motor vehicles, and more particularly, to a vehicle-mounted type of camera suitable for use as a front-view camera to acquire images of objects present in a frontward direction of a vehicle.

2. Description of the Related Art

Vehicle-mounted types of cameras have come to be applied to vehicle-mounted systems for assisting safety driving of the vehicle in which the system is mounted, surveillance systems for detecting abnormalities and the intrusion of unwelcome persons, and other systems. Such a vehicle-mounted type of camera can process an image that the camera mounted in a vehicle has acquired, and use this processed image to extract images of on-road lane markings, traffic signposts, road markings, the immediately preceding vehicle, the opposing vehicle, persons, and the like.

Several vehicle-mounted types of image-processing cameras are available to extract various pieces of information from an image. Typical known examples include a type mounted either on a front rail or rearview mirror of a vehicle interior or on the interior side of the vehicle's windshield to monitor forward, a type mounted near the rear bumper of a vehicle to monitor the rear thereof, and a type mounted on, for example, a front rail or a steering column to monitor the driver or other passengers. U.S. Pat. No. 6,392,218, for example, describes one such camera. Also, stereo cameras are available for highly accurate detection of three-dimensional objects on the road. JP-A-2003-335180, for example, describes, as one such known example, a stereo camera system in which one pair of images acquired in advance with two image acquisition devices are used to recognize a desired object by calculating the distance to the object.

SUMMARY OF THE INVENTION

The common requirements of these cameras include an installation space requirement. In recent years, rain sensors, illuminance sensors, millimeter-wave or laser radar sensors, or other various sensors have come to be mounted in vehicles. This has come to make it necessary that an installation space for devices in a vehicle be as small as possible for more compact mounting of the devices. To avoid obstructing the driver's vision from the vehicle interior, in particular, there is a need to install each device at a position or size that does not give the driver a feeling of visual obstruction or a feeling of oppression.

For installation on the windshield, however, conventional vehicle-mounted types of cameras have had the problem that the installation space tends to increase, with the result that the installed device gives the driver a feeling of visual obstruction or a feeling of oppression.

An object of the present invention is to provide a vehicle-mounted type of camera whose installation space on a windshield can be reduced.

(1) In order to achieve the above object, the present invention is a camera for mounting in a motor vehicle, the camera comprising a substrate, an imaging unit provided on the substrate and having an optical axis in a direction perpendicular to the substrate surface, and a lens disposed on the optical axis. The camera further comprises a mirror provided on the optical axis of the imaging unit and adapted to change a direction of the optical axis to a frontward direction of the vehicle.

The above configuration reduces an installation space requirement of the vehicle-mounted type of camera on a windshield.

(2) In above configuration (1), preferably, the substrate is installed in parallel to the windshield of the vehicle and the mirror is positioned so as to guide frontward visual information of the vehicle to the imaging unit.

(3) In above configuration (1), the mirror is preferably retained by an attachment that can be engaged with and disengaged from an enclosure for retaining the imaging unit.

(4) In above configuration (3), the attachment is preferably constructed to make the mirror installable at a plurality of angles.

(5) In above configuration (1), the mirror is preferably adjustable in angle relative to an enclosure for retaining the imaging unit.

(6) In above configuration (1), the mirror is preferably disposed in part of a field angle of the lens.

(7) In above configuration (6), the mirror is preferably retained by an attachment including a hole provided in close proximity to the mirror-retaining section, in another part of the field angle of the lens, and thus allowing the camera to obtain interior visual information of the vehicle from the hole as well as to obtain exterior visual information of the vehicle from the mirror.

According to the present invention, the installation space on the windshield can be reduced.

DESCRIPTION OF THE PREFERRED EMBODIMENTS

A configuration of a vehicle-mounted type of camera according to a first embodiment of the present invention is described below using FIGS. 1 to 9.

Figure 1:
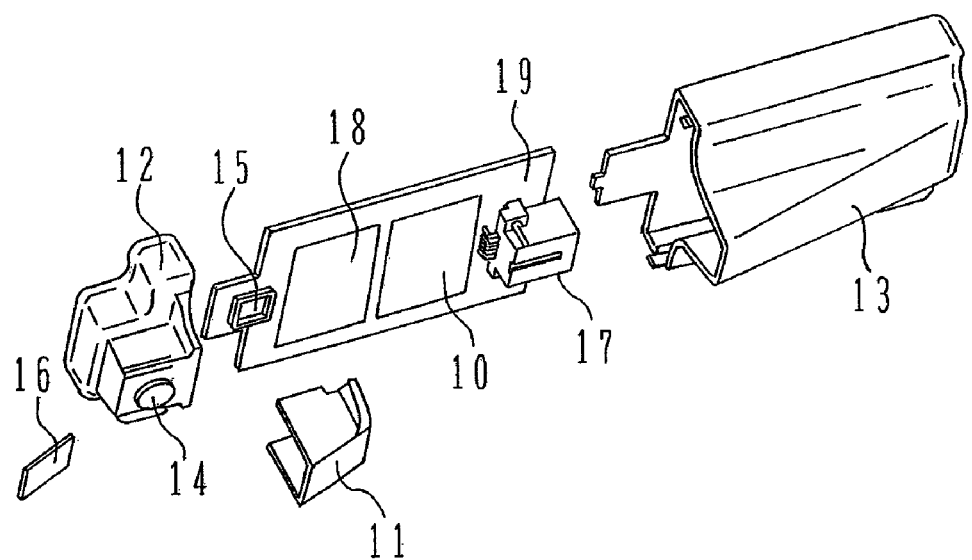
FIG. 1 is an exploded perspective view showing an overall configuration of a vehicle-mounted type of camera according to a first embodiment of the present invention.

First, an overall configuration of the vehicle-mounted type of camera according to the present embodiment is described using FIG. 1.

FIG. 1 is an exploded perspective view showing the overall configuration of the vehicle-mounted type of camera according to the first embodiment of the present invention.

As shown in FIG. 1, the vehicle-mounted type of camera according to the present embodiment includes: a lens 14 for constituting an optical axis; an imaging unit 15; a processing circuit 18 for processing an image that the imaging unit has acquired; a power supply circuit 10 for driving the processing circuit 18; a connector 17 used for communication as well as for supplying electric power to the camera and receiving vehicle information; a substrate 19 on which the imaging unit 15, the processing circuit 18, the power supply circuit 10, and the connector 17 are mounted; a substrate cover 13 for protecting the substrate 19; a camera enclosure 12 for maintaining a relationship in position between the lens 14 and the imaging unit 15; an attachment 11 constructed to fit onto the camera enclosure 12; and a mirror 16 installed in the attachment 11.

The lens 14 forms visual information of an external environment into images in the imaging unit 15. The visual information that has thus been imaged in the imaging unit 15 is used for the processing circuit 18 to extract a variety of characteristic objects such as vehicles, pedestrians, and lanes. Final arithmetic results are output to outside via the connector 17. Electric power to be supplied to the camera is received from a motor vehicle in which the camera is mounted. The power that has been received from the vehicle is sent to the power supply circuit 10 via the power supply connector 17, then converted into a necessary voltage, and supplied to microcomputers and ICs.

To rid a driver of any feelings of visual obstruction or oppression, it is necessary to reduce particularly an area of the camera in a vertical direction thereof by minimizing an installation space in the vehicle. To this end, it is preferable that a windshield of the vehicle and the substrate 19 be installed in parallel as far as possible. At this time, when visual information is imaged in the imaging unit 15 installed on the substrate 19, the optical axis of the lens 14 and an imaging surface of the imaging unit 15 need to be perpendicular to each other. If this perpendicularity is not obtained, this will blur a part of the image, resulting in the image being unsuitable for processing. When the above relationship in position between the imaging unit 15 and the lens 14 is maintained, the imaging unit 15 on the substrate 19 installed in parallel to the windshield faces in a direction different from an original, desired imaging direction.

The present embodiment, therefore, acquires visual information of the original desired imaging direction (a frontward direction of the vehicle) by converting an optical-axis direction of the imaging unit by means of the mirror 16 installed in the attachment 11.

Figure 2:
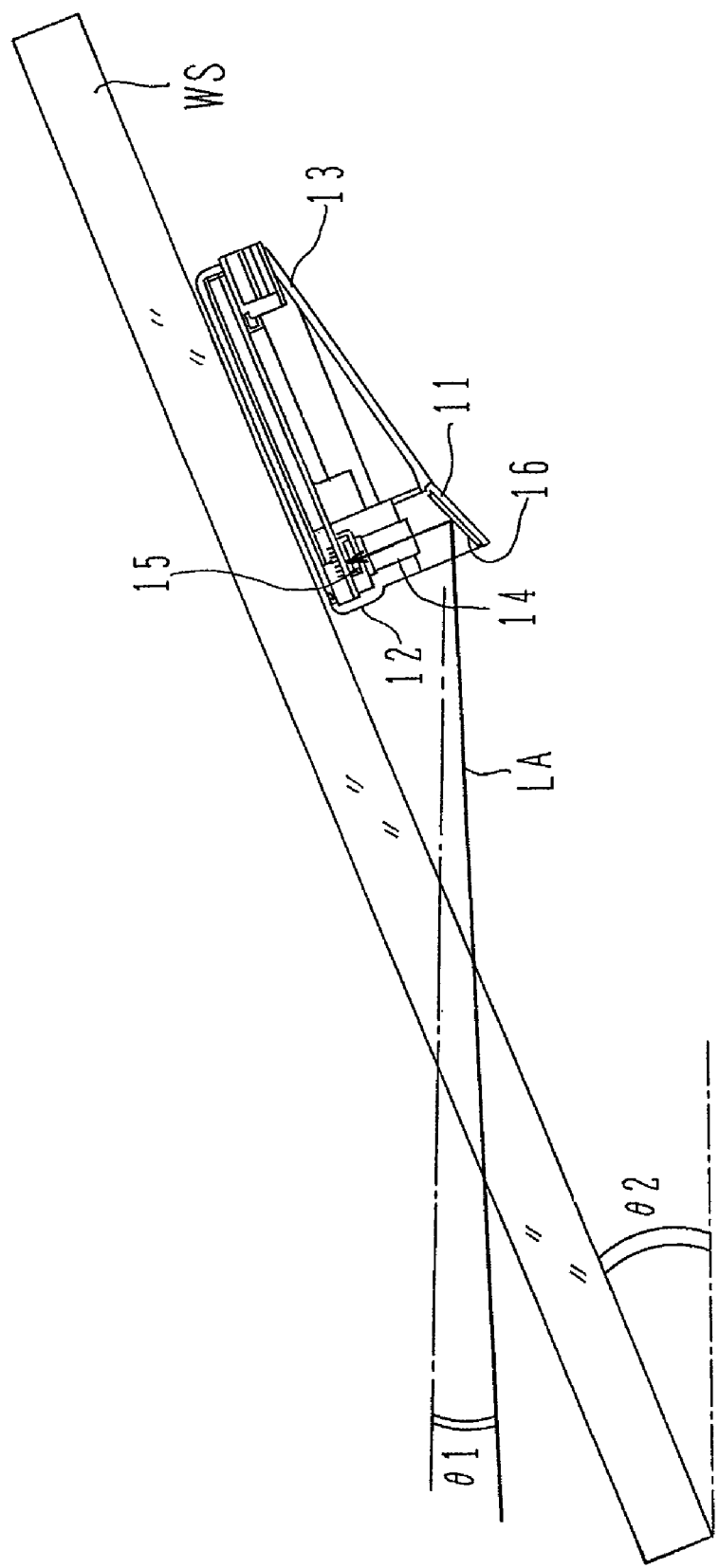
FIG. 2 is a side sectional view for explaining an installation angle of a mirror in the vehicle-mounted type of camera according to the first embodiment of the present invention.

Next, an installation angle of the mirror 16 in the vehicle-mounted type of camera according to the present embodiment is described using FIG. 2.

FIG. 2 is a side sectional view for explaining the installation angle of the mirror 16 in the vehicle-mounted type of camera according to the first embodiment of the present invention. In FIG. 2, the same reference numbers or symbols as used in FIG. 1 designate the same elements.

The direction of the optical axis shown as LA (Light Axis) in FIG. 2 is generally parallel to an infinite point, that is, the ground surface. During actual operation, however, LA is slightly inclined downward according to an angle of the lens used, or for minimizing any impacts of solar light. A field angle necessary for lane detection, for instance, needs to be an angle at which all objects within an irradiation range of front headlights can be imaged even at night. In general, irradiation angles of front headlights are about 30 degrees, so the lens is inclined by 30 degrees in a horizontal direction. When a perpendicular angle of field is considered for this horizontal angle of field of 30 degrees, a ratio of the horizontal and perpendicular angles of field becomes 4:3 in a charge-coupled device (CCD) with 250,000 pixels, for example. In this case, therefore, the perpendicular angle of field is 22.5 degrees for the horizontal angle of field of 30 degrees. Under this state, to detect a vehicle traveling ahead, if this target vehicle is a truck with a height of 2 meters and is traveling at a distance of 15 meters ahead, an angle region up to about 8 degrees upward from the horizontal direction needs to be imaged. If the optical axis is horizontal, it follows from the foregoing calculation results that angles up to 11.25 degrees upward from the horizontal direction are the imaging angles. That is to say, an angle range from 8 degrees to 11.25 degrees is an unnecessary range. If the optical axis is directed more upward than necessary, smearing and other factors that cause a loss of the visual information will increase under the impacts of solar light. For this reason, only information necessary for image processing can be acquired by directing the optical axis LA downward by an angle of θ1 (3 degrees) with respect to a horizontal line HL.

In contrast to this, a windshield WS of a general sedan type of vehicle has an inclination angle θ2 of about 25 degrees. If an angle upward from a horizontal position of the vehicle is defined as a plus angle, and an angle downward from the horizontal position is defined as a minus angle, a perpendicular line of the imaging unit is inclined at an angle of 75 degrees with respect to the horizontal position. However, a final angle desired of the optical axis 31 is −3 degrees, so a conversion angle of the optical axis is 78 degrees. The angle at which the mirror 16 is to be installed, therefore, is inclined at 38 degrees. The installation angle of the mirror 16 depends upon the inclination angle θ2 of the windshield WS and the desired imaging direction. This configuration makes minimization of the installation space possible and frontward visual information obtainable.

Figure 3:
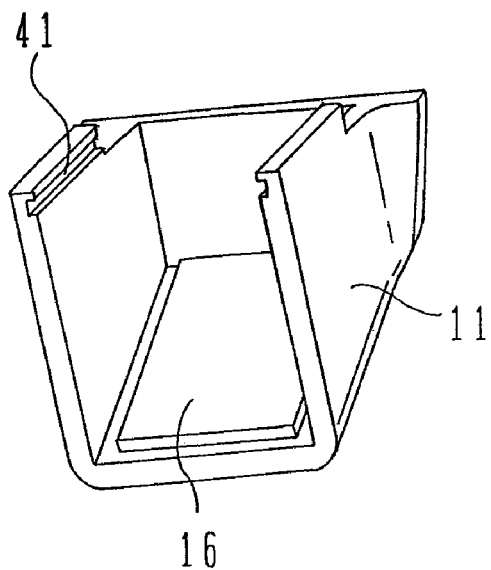
FIG. 3 is a perspective view showing a first configuration of a mirror attachment used in the vehicle-mounted type of camera according to the first embodiment of the present invention.

Next, a first configuration of a mirror attachment used in the vehicle-mounted type of camera according to the present embodiment is described using FIG. 3.

FIG. 3 is a perspective view showing the first configuration of the mirror attachment used in the vehicle-mounted type of camera according to the first embodiment of the present invention. In FIG. 3, the same reference numbers or symbols as used in FIG. 1 designate the same elements.

The mirror attachment includes the mirror 16 and the attachment 11 adapted for accommodating the mirror 16. A mirror attachment positioning groove 41, for example, is provided as a structure for mounting the mirror attachment 11 on the enclosure 12 shown in FIG. 1, the enclosure 12 being adapted to maintain the relationship in position between the lens 14 and the imaging unit 15. The mirror attachment can be readily engaged with and disengaged from the enclosure 12 very accurately just by sliding an edge of the attachment along the positioning groove 41.

The attachment 11 preferably uses a resin material of high flexibility in shape or uses an aluminum-diecast or any other molded metallic material having a reflection surface created during post-molding.

Also, the mirror 16 may be formed by, for example, depositing aluminum on the mirror attachment 11 or affixing a mirror material deposited on glass. For mirror deposition, the mirror may be constructed so as to reflect only a desired wavelength range of light. A general CCD has sensitivity in a wavelength band from 400 to 1,000 nm. Visual information only of visible light is image-processable by, for example, assigning to the CCD such characteristics that reflect, of all light of the above wavelength band, only light of a wavelength band equal to or shorter than 700 nm which is a wavelength band of the visible light. Alternatively, images of taillights of an immediately preceding vehicle can be intensively extracted if the mirror material is deposited for the mirror to have such band-pass filter characteristics that permit passage only of light of 650 nm which is a wavelength of a red spectrum. As described above, wavelength characteristics of the mirror can be changed according to the kind of visual information to be acquired.

Figure 4:
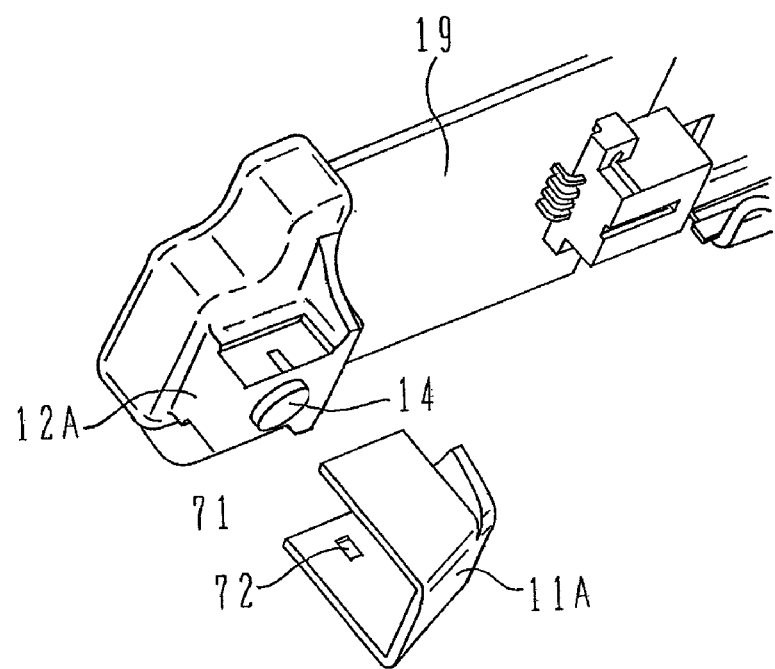
FIG. 4 is a perspective view showing a second configuration of a mirror attachment used in the vehicle-mounted type of camera according to the first embodiment of the present invention.

A second configuration of a mirror attachment used in the vehicle-mounted type of camera according to the present embodiment is described using FIG. 4.

FIG. 4 is a perspective view showing the second configuration of the mirror attachment used in the vehicle-mounted type of camera according to the first embodiment of the present invention. In FIG. 4, the same reference numbers or symbols as used in FIG. 1 designate the same elements.

The mirror attachment can include a groove that extends in a longitudinal direction of the attachment. In this case, as shown, the groove 71 is provided in an enclosure 12A and a guide 72 is provided in the attachment 11A so that the attachment can be installed while being positioned at the groove 71. Alternatively, the enclosure 12A and the mirror attachment 11A can have a guide and a groove, respectively.

In addition, the mirror attachment 11A can use screws as a fixing method therefor.

Figure 5:
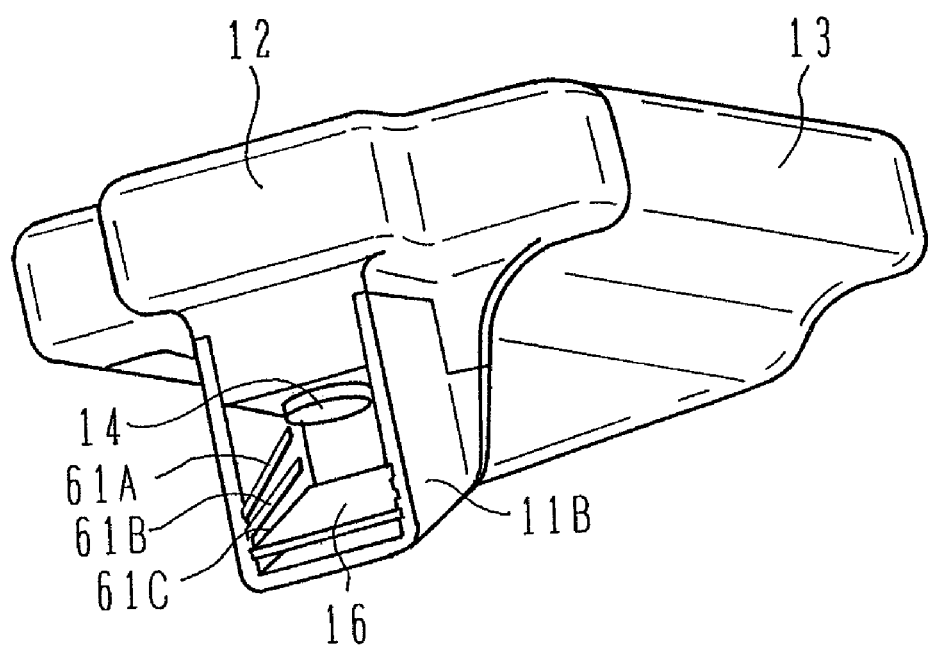
FIG. 5 is a perspective view for explaining a first example of changing the installation angle of the mirror in the vehicle-mounted type of camera according to the first embodiment of the present invention.

Next, a first example of changing the installation angle of the mirror in the vehicle-mounted type of camera according to the present embodiment is described using FIG. 5.

FIG. 5 is a perspective view for explaining the first example of changing the installation angle of the mirror in the vehicle-mounted type of camera according to the first embodiment of the present invention. In FIG. 5, the same reference numbers or symbols as used in FIG. 1 designate the same elements.

The installation angle of the mirror may need to be changed if the inclination angle of the windshield differs from that described above (i.e., if the vehicle in which the camera is to be installed is of a type different from that described above). A mirror attachment 11B, therefore, includes a plurality of grooves 61A, 61B, and 61C beforehand that match a plurality of angles at which the mirror can be installed.

For an ordinary sedan type of vehicle, the groove 61C is used to install the mirror 16 so that the inclination angle thereof is smaller. For a large inclination of a windshield, as of a sports car, the mirror is installed in the groove 61A or 61B for a larger installation angle of the mirror. In this way, the installation angle of the mirror can be easily changed according to a particular loose classification of vehicles, such as sport utility vehicles (SUVs), sedans, or sports cars.

Figure 6:
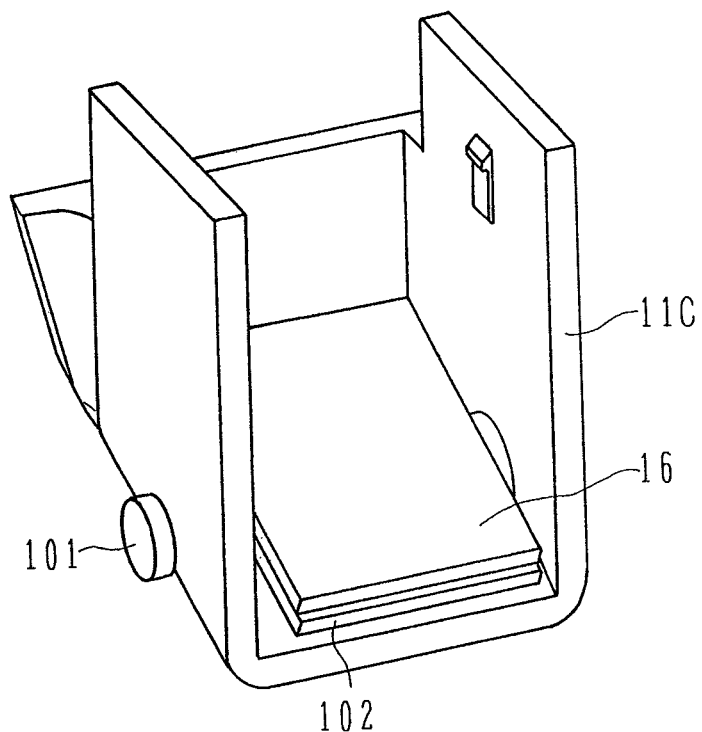
FIG. 6 is a perspective view for explaining a second example of changing the installation angle of the mirror in the vehicle-mounted type of camera according to the first embodiment of the present invention.
Figure 7:
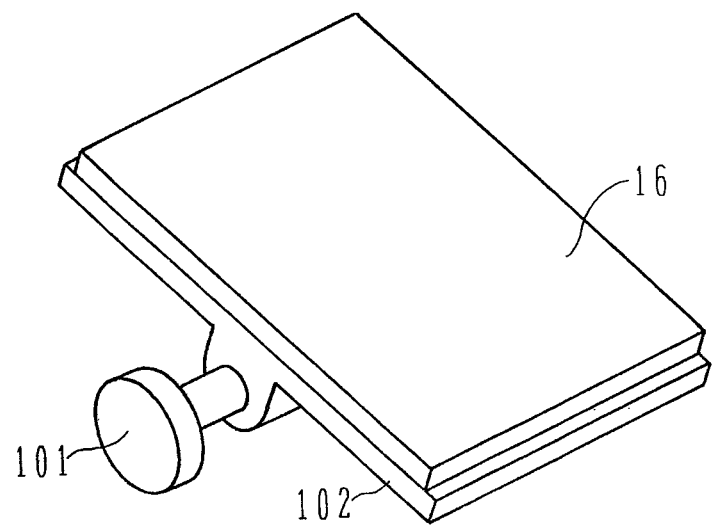
FIG. 7 is a perspective view showing a configuration of a mirror installation pedestal in the second example of changing the installation angle of the mirror in the vehicle-mounted type of camera according to the first embodiment of the present invention.

Next, a second example of changing the installation angle of the mirror in the vehicle-mounted type of camera according to the present embodiment is described using FIGS. 6 and 7.

FIG. 6 is a perspective view for explaining the second example of changing the installation angle of the mirror in the vehicle-mounted type of camera according to the first embodiment of the present invention. FIG. 7 is a perspective view showing a configuration of a mirror installation pedestal in the second example of changing the installation angle of the mirror in the vehicle-mounted type of camera according to the first embodiment of the present invention. In FIG. 6, the same reference numbers or symbols as used in FIG. 1 designate the same elements.

As shown in FIG. 6, an attachment 11C has a knob 101. The angle of the mirror 16 can be changed to a desired value by rotating the knob 101. As shown in FIG. 7, the knob 101 is coupled to a pedestal 102 having the mirror 16 installed thereon. Rotating the knob 101 moves the pedestal 102, thus making the angle of the mirror 16 changeable.

Adoption of this structure makes stepless changing of the mirror angle possible, hence rendering the mirror applicable to substantially all kinds of vehicles.

The pedestal 102 on which to install the mirror may have the mirror installed thereon or may be formed of aluminum to endow the pedestal itself with performance of a mirror.

Figure 8:
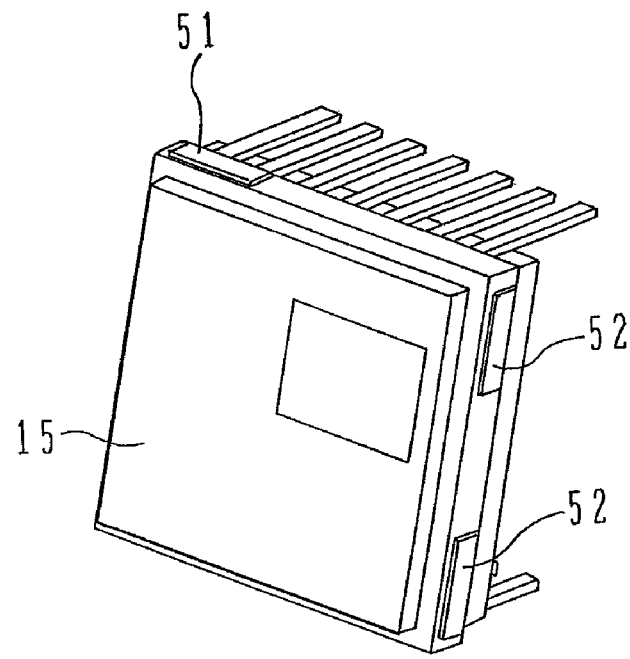
FIG. 8 is a perspective view for explaining a positioning structure of an imaging unit in the vehicle-mounted type of camera according to the first embodiment of the present invention.
Figure 9:
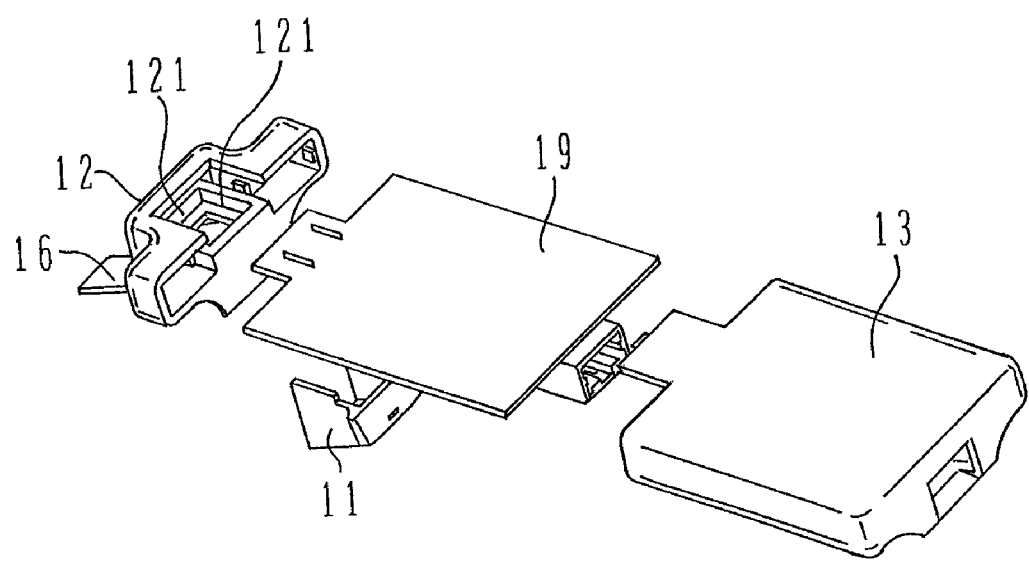
FIG. 9 is a perspective view for explaining the positioning structure of the imaging unit in the vehicle-mounted type of camera according to the first embodiment of the present invention.

Next, a positioning structure of the imaging unit in the vehicle-mounted type of camera according to the present embodiment is described using FIGS. 8 and 9.

FIGS. 8 and 9 are perspective views for explaining the positioning structure of the imaging unit in the vehicle-mounted type of camera according to the first embodiment of the present invention. In FIG. 8, the same reference numbers or symbols as used in FIG. 1 designate the same elements.

When such mirror attachment as described above is installed for frontward imaging, it is essential that a relationship in position between the imaging unit 15, the lens 14, and the mirror 16 be maintained with higher accuracy to acquire as accurately as possible the visual information required.

A method of positioning the imaging unit and the lens more accurately will be described below using FIGS. 8 and 9.

FIG. 8 shows a visual configuration of a CCD which is the imaging unit 15. On a side thereof, the imaging unit 15 has reference planes 51 and 52 that serve as a basis for installation.

FIG. 9, an exploded perspective view of the vehicle-mounted type of camera according to the present embodiment, shows the camera existing when FIG. 1 is viewed from underside.

In the enclosure 12, reference planes 121 and 122 for positioning are provided, which establishes the relationship in position between the imaging unit 15 and the lens 14, as shown in FIG. 1. More specifically, in order to establish perpendicular position accuracy, the reference plane 121 with which the perpendicular reference plane 51 for the imaging unit 15 comes into contact is provided in the enclosure 12. In order to establish horizontal position accuracy, the reference plane 122 with which the horizontal reference plane 52 for the imaging unit comes into contact is also provided in the enclosure 12.

Since positional accuracy of the mirror 16 is another factor that significantly affects installation accuracy of the attachment 11, the attachment 11 is also assigned an accurate reference plane for positioning and fixing of the attachment. Misalignment in the direction of the optical axis can be minimized by realizing the highly accurate positional relationship between the mirror, the lens, and the imaging unit, in this way.

The visual information to be acquired can be obtained by changing the installation location or imaging direction of the camera. In addition, changing the field angle of the lens, that is, using a wider-angle lens allows a larger amount of information to be acquired, or using a telephoto lens allows images of distant objects to be intensively extracted. The changes for a lens of a different angle of field in such cases can also be easily conducted by adopting the attachment structure of the present embodiment.

In addition, the camera can be used as a vehicle-interior supervisory camera by removing the mirror attachment 11.

As set forth above, according to the present embodiment, desired visual information can be acquired using a common enclosure, even in a vehicle-mounted type of camera more diversified in installation location or installation angle. Furthermore, the feelings of visual obstruction or oppression that may be caused to the driver when the vehicle-mounted type of camera is affixed to the windshield are minimized to make the camera applicable to various kinds of vehicles by introducing minimum changes in shape.

Figure 10:
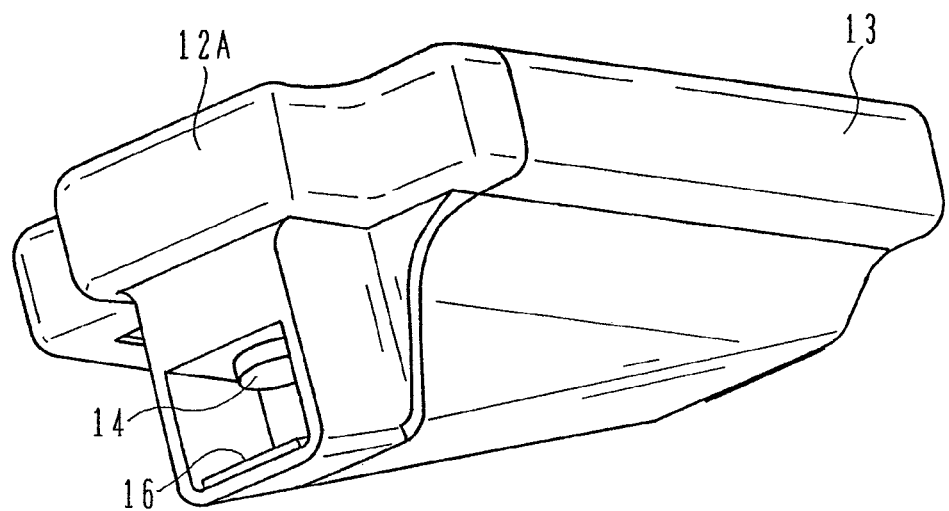
FIG. 10 is a perspective view showing a configuration of a vehicle-mounted type of camera according to a second embodiment of the present invention.

Next, a configuration of a vehicle-mounted type of camera according to a second embodiment of the present invention is described using FIG. 10.

FIG. 10 is a perspective view showing the configuration of the vehicle-mounted type of camera according to the second embodiment of the present invention. In FIG. 10, the same reference numbers or symbols as used in FIG. 1 designate the same elements.

An enclosure 12A in the present embodiment is a member formed by integrating the enclosure 12 and attachment 11 shown in FIG. 1. When the installation angle of the mirror 16 is changed, the mirror itself is changed together with the enclosure 12A that is the integrated member.

As set forth above, according to the present embodiment, desired visual information can be acquired using a common enclosure, even in the vehicle-mounted type of camera more diversified in installation location or installation angle. Furthermore, the feelings of visual obstruction or oppression that may be caused to the driver when the vehicle-mounted type of camera is affixed to the windshield are minimized to make the camera applicable to various kinds of vehicles by introducing minimum changes in shape.

Next, a configuration of a vehicle-mounted type of camera according to a third embodiment of the present invention will be described using FIGS. 11 to 13.

Cameras designed to be installed near the windshield are in increasing demand for their vehicle-interior supervisory applications. For example, these cameras can be used to recognize the driver's or other front-seat passenger's body sizes, sitting positions on the seats, and the like, and change a way of unfolding airbags. These cameras are also useable for security purposes and can have functions such as imaging the vehicle interior for abnormalities.

Figure 11:
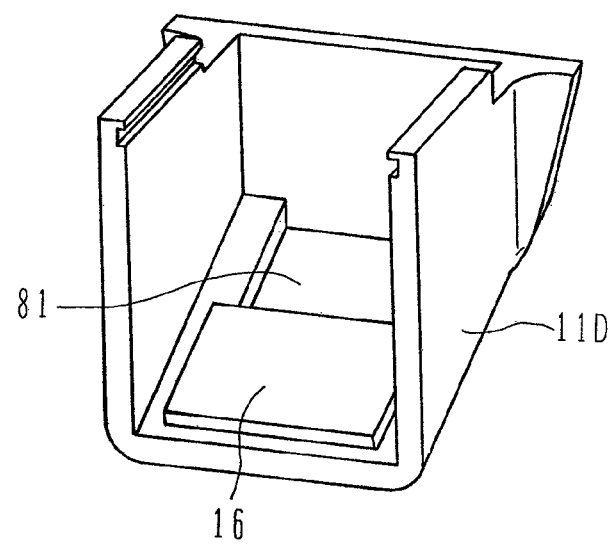
FIG. 11 is a perspective view showing a configuration of an attachment used in a vehicle-mounted type of camera according to a third embodiment of the present invention.
Figure 12:
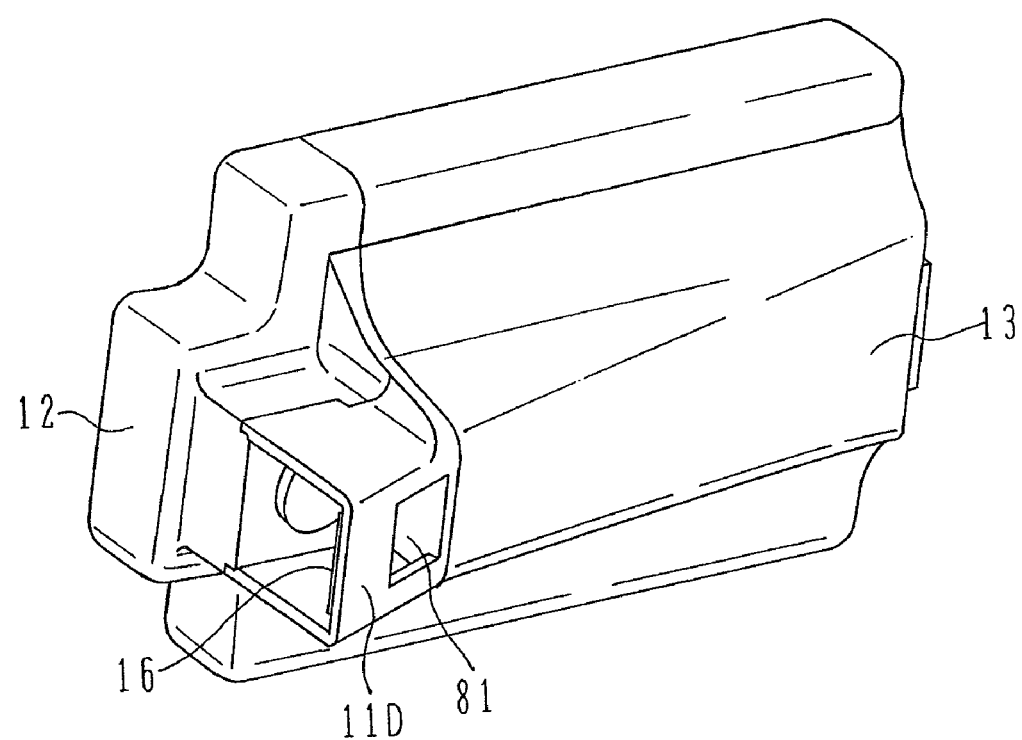
FIG. 12 is a perspective view showing a configuration of the vehicle-mounted type of camera according to the third embodiment of the present invention.

First, the configuration of the vehicle-mounted type of camera according to the present embodiment is described using FIGS. 11 and 12.

FIG. 11 is a perspective view showing a configuration of an attachment used in the vehicle-mounted type of camera according to the third embodiment of the present invention. FIG. 12 is a perspective view showing the configuration of the vehicle-mounted type of camera itself according to the third embodiment of the present invention. In FIGS. 11 and 12, the same reference numbers or symbols as used in FIG. 1 designate the same elements.

The attachment 11D in the present embodiment has a hole 81 at an installation surface of the mirror 16. The mirror 16 for vehicle-exterior supervisory purposes is installed in front of the attachment 11D, and the hole 81 for vehicle-interior supervisory purposes is provided at rear.

Constructing the attachment in this way makes it possible to monitor the vehicle exterior from an image reflected from the mirror 16, and at the same time, to monitor the vehicle interior through the hole 81. In addition, both interior and exterior information of the vehicle can be acquired simultaneously. Image processing of these multiple kinds of visual information, therefore, makes it possible, for example, to detect the driver looking away or dozing off at the wheel, and at the same time to calculate a distance to the immediately preceding vehicle, judge a potential risk level of a collision, and alert the risk to the driver.

Figure 13:
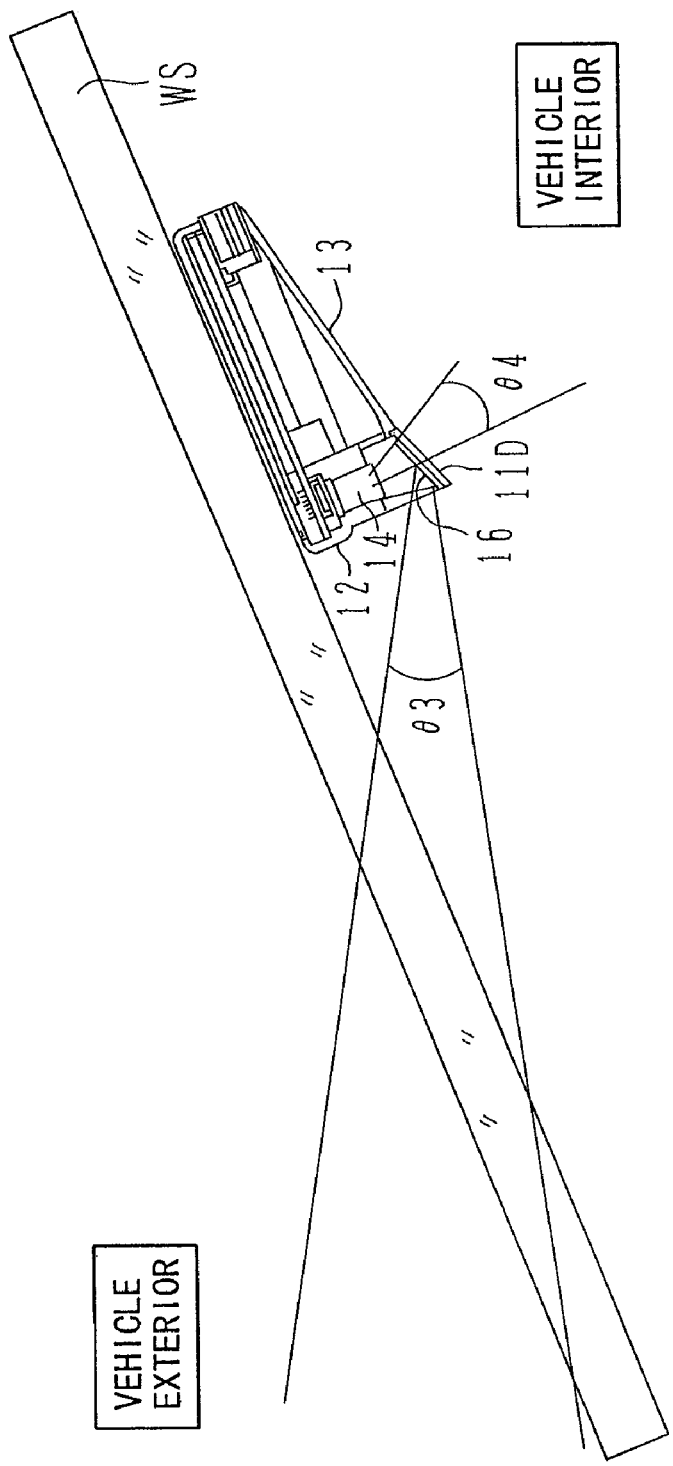
FIG. 13 is an explanatory diagram of a visual field rate of a vehicle interior and exterior in the vehicle-mounted type of camera according to the third embodiment of the present invention.

Next, a visual field rate of the vehicle interior and exterior in the vehicle-mounted type of camera according to the present embodiment is described using FIG. 13.

FIG. 13 is an explanatory diagram of the visual field rate of the vehicle interior and exterior in the vehicle-mounted type of camera according to the third embodiment of the present invention.

As described per FIG. 2, the angle 91 needed to acquire information of the vehicle exterior is 22.5 degrees. In contrast to this, a field angle of about 41 degrees is required for the camera to monitor the driver or other front-seat passenger, for example, to monitor, at a distance of 0.8 meters from the camera, an object with a height of about 90 cm, which is equal to seating height of an average adult male. An angle θ4 required for the camera to acquire information of the vehicle interior is the field angle described above.

If the lens to be used has a perpendicular field angle of 63.5 degrees, a ratio of the mirror 16 and the hole 81 is determined so that visual field information within 22.5 degrees only of the particular field angle range is imaged into part of an area of the imaging unit, and visual field information within 41 degrees, into the remaining area. That is to say, the ratio of the mirror 16 and the hole 81 is determined to be 35.4%:64.6%. For example, if the distance from the lens to the mirror is 5 mm, a total area size of the mirror and the hole amounts to about 16 mm. An area of 5.7 mm equivalent to 35.4% of this total area size is used as the mirror area, and 10.3 mm accounting for the remaining 64.6% is used as a size of the hole.

Information on the interior and exterior of the vehicle can be acquired by determining the field angles required for information acquisition in each of the vehicle interior and exterior, and using the mirror 16 and the hole 81 with a total value of the two field angles as a field angle of the lens.

As described above, according to the present embodiment, desired visual information can be acquired using a common enclosure, even in the vehicle-mounted type of camera more diversified in installation location or installation angle. Furthermore, the feelings of visual obstruction or oppression that may be caused to the driver when the vehicle-mounted type of camera is affixed to the windshield are minimized to make the camera applicable to various kinds of vehicles by introducing minimum changes in shape.

In addition, information on both the interior and exterior of the vehicle can be obtained with one camera.

Any of the attachment structures described per FIGS. 1 to 13 is also applicable to a multi-camera arrangement and to a stereo camera configuration. In these cases, one attachment can be used for all the plurality of cameras or the structure of the attachment or the installation angle of the mirror can be changed according to camera. Various pieces information can be acquired using multiple kinds of attachments.

What is claimed is:

1. A camera for mounting in a motor vehicle, the camera comprising:
   a substrate;
   an imaging unit provided on the substrate, the imaging unit having an optical axis in a direction perpendicular to the substrate surface;
   a processing circuit for processing an image acquired by the imaging unit;
   a lens disposed on the optical axis;
   a mirror provided on the optical axis of the imaging unit in order to change a direction of the optical axis to a frontward direction of the vehicle; and
   an attachment for retaining the mirror; wherein
   the camera is disposed on a windshield of the vehicle;
   the imaging unit, the lens, and the mirror are disposed on the optical axis of the imaging unit in this order from the windshield of the vehicle;
   the imaging unit and the processing circuit are disposed on the same surface of the substrate;
   the substrate is disposed in parallel with the windshield of the vehicle;
   the mirror is disposed in a part of a field angle of the lens;
   the attachment provides a hole close to a mirror-retaining section and in another part of the field angle of the lens; and
   the camera is adapted to obtain both interior visual information of the vehicle from the hole and exterior visual information of the vehicle from the mirror.

2. The camera according to claim 1, wherein:
   the camera further comprises an attachment for retaining the mirror; and
   the attachment is adapted to be engaged with and disengaged from an enclosure which holds the imaging unit.

3. The camera according to claim 2, wherein: the attachment is constructed to incline the mirror at a plurality of angles.

4. The camera according to claim 1, wherein: the mirror has a function that changes an angle thereof with respect to an enclosure which holds the imaging unit.

* * * * *